Sept. 15, 1953            H. WESLAKE           2,652,039
SUPPLY SYSTEM FOR COMBUSTIBLE MIXTURE
FOR INTERNAL-COMBUSTION ENGINES Filed Feb. 14, 1949                       3 Sheets-Sheet 1

INVENTOR
HENRY WESLAKE
By Young, Emery & Thompson
ATTYS.

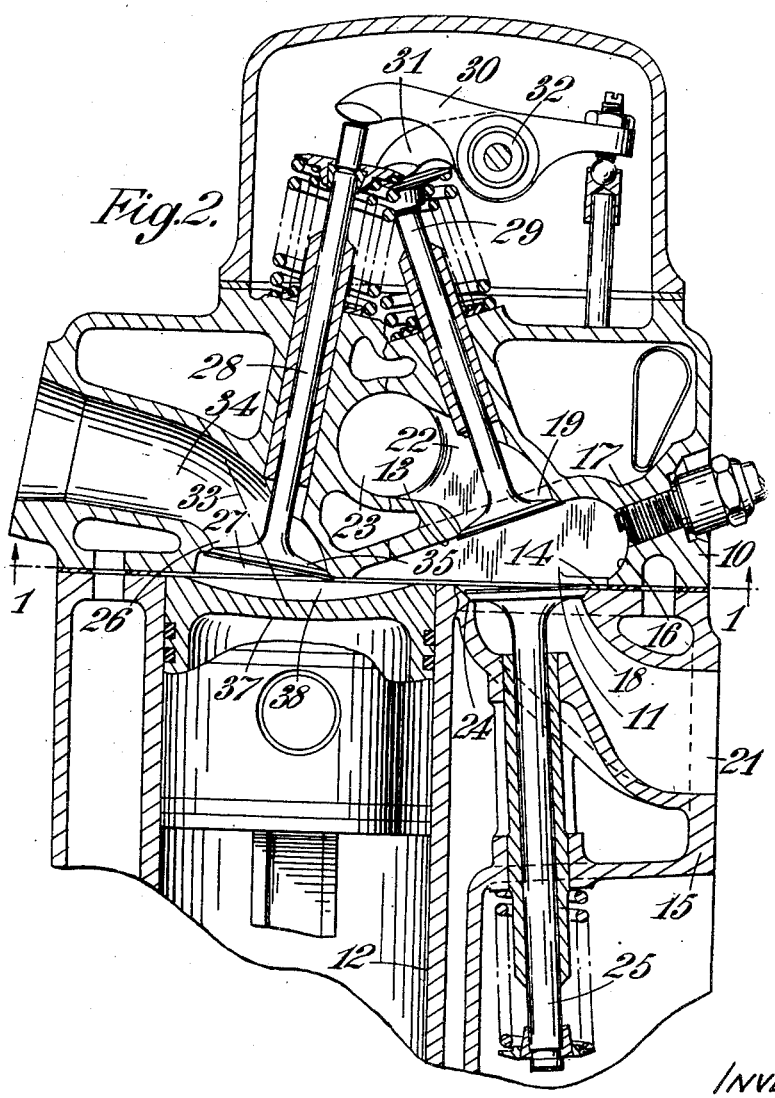

Sept. 15, 1953 H. WESLAKE 2,652,039
SUPPLY SYSTEM FOR COMBUSTIBLE MIXTURE
FOR INTERNAL-COMBUSTION ENGINES
Filed Feb. 14, 1949 3 Sheets-Sheet 3
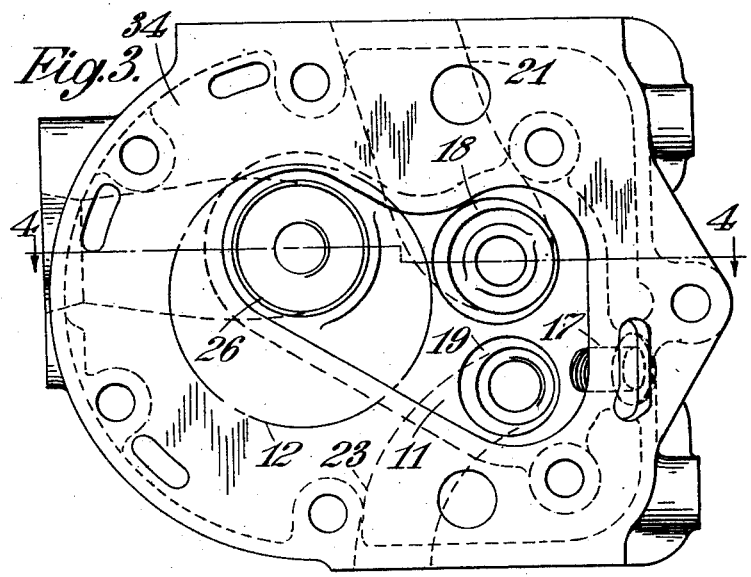
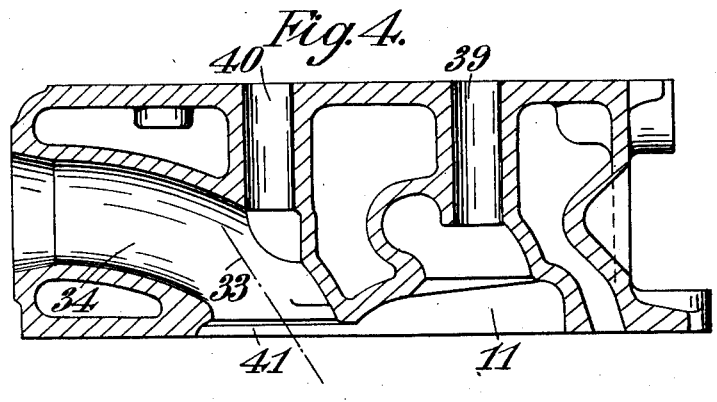
INVENTOR
HENRY WESLAKE
By Young, Emery & Thompson
Attys.

Patented Sept. 15, 1953

2,652,039

UNITED STATES PATENT OFFICE 2,652,039

SUPPLY SYSTEM FOR COMBUSTIBLE MIXTURE FOR INTERNAL-COMBUSTION ENGINES

Henry Weslake, St. Leonards-on-Sea, England

Application February 14, 1949, Serial No. 76,376
In Great Britain February 18, 1948

15 Claims. (Cl. 123—75)

This invention relates to supply systems for combustible mixture for internal combustion engines of the kind in which the mixture is controlled by a number of inlet valves opening into the combustion chamber, one of which is provided with means for supplying air or a weak combustible mixture (hereinafter referred to as the "air valve") and the other of which is provided with means for supplying a rich mixture. An object of the invention is to enable high compression ratios to be used without pre-ignition or pinking of the charge taking place.

According to this invention, a cylinder head for internal combustion engines of the kind having an air or weak mixture inlet valve and a rich mixture inlet valve is characterised in that the air inlet valve is arranged in a part of the combustion chamber over the engine cylinder and the rich mixture inlet valve and an exhaust valve are arranged in a part of the combustion chamber extending to the side of the cylinder.

Preferably, the rich mixture valve and exhaust valve are arranged in opposite walls of the combustion chamber with the exhaust port in that wall which is level with the top of the cylinder or both parts may be arranged in that face.

The inlet port and passage for the air valve are so arranged as to direct inflowing air around the wall of the cylinder whereby an ordered swirl is produced.

In the case of a poppet valve engine, the end of the passage adjacent the air port has its axis inclined to the axis of the cylinder in a plane disposed to one side of the cylinder axis, thereby producing said swirl.

This end of the air port may be located immediately adjacent the cylinder wall, whereby the latter is swept by the aforesaid swirl.

The promotion of the swirl may be enhanced by arranging the axis of the air valve stem to be inclined to the axis of that part of the passage adjacent the air port so that the flow of air strikes the inner side of the head of the valve at an angle and is deflected in the required direction around the cylinder wall. With this arrangement the plane of the air inlet port is inclined to a plane which is at right angles to the axis of the cylinder.

The part of the combustion chamber extending to one side of the engine cylinder may be provided by a cavity in the cylinder head having the roof at right angles to the cylinder axis or inclined at an angle thereto, the opposite wall of the cavity provided by a face of the cylinder block and may be joined to the roof by a rounded concave wall facing towards the cylinder.

The side walls of the cavity may be parallel or nearly parallel to one another.

In the case where the rich mixture valve port is in the roof of the cavity and the exhaust valve port is in the opposite wall the stem of the rich mixture valve may be inclined to the engine cylinder and to the air inlet valve and also to the exhaust valve stem, and the outer ends of the stems of the rich mixture and air valves may be adjacent one another so as to be operable by rockers mounted on the same rocker shaft.

The exhaust valve stem may be inclined slightly to the axis of the cylinder so that the edge of the valve seat nearer the cylinder is slightly countersunk in the aforesaid face of the cylinder block.

The above arrangement is such that the rich mixture upon entering the combustion chamber is directed around the concave wall in which the sparking plug socket is situated thereby providing a swirl in the combustion space about an axis transverse to the axis of the engine cylinder, which swirl is largely independent of the swirl of air or weak mixture in the engine cylinder proper, which takes place around the axis of the cylinder. It is thought that these two swirls continue during the compression stroke and when ignition takes place the explosion wave front advances towards a zone of weak mixture or air, thus preventing pre-ignition and pinking and detonation.

Preferably the piston is provided with a concave face and/or the cylinder head above the cylinder is spaced away from the crown of the piston so that at top dead centre a part of the combustion space is arranged over the cylinder, as well as in the laterally-disposed valve cavity.

The following is a description of two alternative embodiments of the invention, reference being made to the accompanying drawing, in which:

Figure 2 is a section through the top part of a cylinder and cylinder head on the bent line 2—2 of Figure 1;

Figure 3 is an underplan view of an alternative cylinder head; and

Figure 4 is a section through the cylinder head on the line 4—4 of Figure 3.

Figure 1:
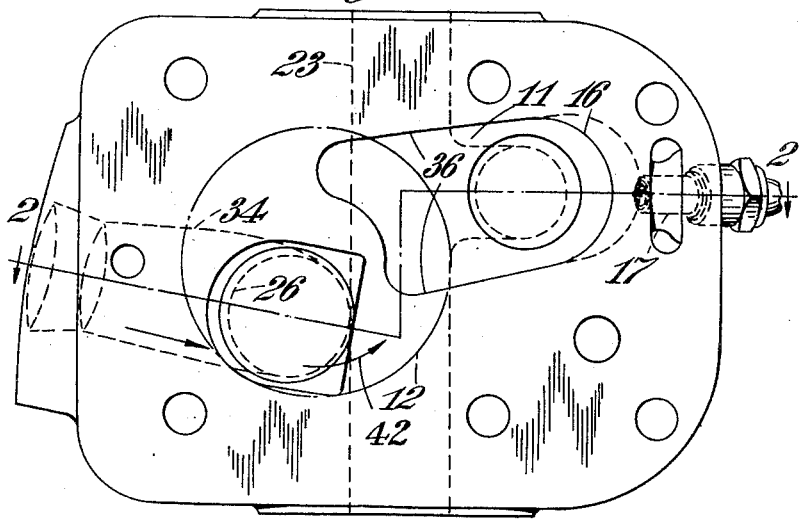
Figure 1 is an underplan view of the cylinder head.

Referring to the construction shown in Figures 1 and 2, it will be seen that the cylinder head 10 is provided with a valve cavity 11 extending to one side of the cylinder 12 and having a roof 13 inclined to the axis of the engine cylinder. The opposite wall of the valve cavity is provided by a face 14 of the cylinder block 15 which is joined with the roof of the valve cavity by a concavely curved wall 16 through which the sparking plug socket 17 extends. The exhaust valve port 18 is formed in the face 14 of the cylinder block, while an inlet port 19 for rich mixture is formed in the inclined wall 13 of the cavity so as to lie opposite the exhaust port. The exhaust port communicates with a passage 21 extending out through the side of the cylinder block, while the inlet port communicates with a passage 22 leading to a manifold 23 for the rich mixture. The plane of the exhaust valve seat is inclined to a plane at right angles to the axis of the cylinder so that the edge 24 of the seat adjacent the cylinder is countersunk to a greater extent than the opposite edge, thus the stem 25 of the exhaust valve is inclined to the axis of the cylinder. An inlet port 26 for air or weak mixture is formed in the cylinder head over the cylinder and is of a larger size than the rich mixture port 19. This port 26 is formed in a small wedge-shaped cavity 27 so that the plane of the port is inclined to a plane at right angles to the cylinder. Thus the stems 28 and 29 of the two inlet valves converge so that they may be conveniently operated by rockers 30 and 31 which are mounted to rock about the same rock shaft 32. It will be noted the axis 33 of that part of the passage 34 adjacent the valve port 26 is inclined to the general plane of the head 35 of the valve so as to tend to direct the air or weak mixture towards the opposite side of the cylinder. It will be noted from Figure 1 that the port 26 is disposed close to one side of the cylinder wall so that the gases entering through the port tend to sweep around the cylinder wall as shown by the arrows 42. The side walls 36 of the cavity 11 are nearly parallel. The crown 37 of the piston is provided with a concavity 38.

The timing of the valves is such that the rich mixture valve and exhaust valve are never open together.

The shaping of the combustion chamber and the disposition of valves is such that the air or weak mixture entering through the valve port 26 will have imparted to it a swirl about the axis of the engine cylinder, while the rich mixture entering the valve port 19 will be given a swirl about an axis at right angles to the engine cylinder. With this arrangement the scavenging of the combustion chamber by the air may take place before the rich mixture is introduced. A certain proportion of the swirling air in the cylinder enters the swirling rich mixture in the combustion chamber at one side of the engine cylinder so that the ideal mixture for quick combustion is produced and as indicated above, when firing takes place the explosion wave front moves towards a zone of pure air or weak mixture, thereby preventing pinking or pre-ignition or detonation taking place and may permit higher compression ratios to be used.

The proportion of air for combustion passing through the ports 19 and 26 is determined by the relative sizes of these ports. Preferably the port 26 is made larger than the port 19 so that the greater part of the air flows directly into the cylinder. In the case where carburettors are employed for feeding the two ports the quantity of fuel passing through the two ports will be proportional to the air passing those ports.

The arrangements shown in Figures 3 and 4 differ in that both the exhaust port 18 and the rich mixture port 19 are provided in the roof of the cavity 11. The valve guides are arranged parallel to the axis of the cylinder, the exhaust valve guide 39 and air or weak mixture valve guide 40 being shown in Figure 4. The arrangement shown is for an experimental single cylinder engine, and the passages 21, 23 and 34 leading to the exhaust port, rich mixture port and air or weak mixture port respectively are shown extending to different sides of the cylinder head block.

It will be noted from Figure 4 that the valve seat for the air or weak mixture valve is recessed in the roof of the cylinder head over the cylinder so as to provide a gap 41 between the crown of the piston and the roof of the cylinder head at top dead centre.

I claim:

1. A spark fired internal combustion engine comprising a cylinder, a piston in the cylinder, a combustion chamber extending over and to one side of the end of the cylinder, a valve controlled passage for weak mixture or air opening into that part of the combustion chamber over the cylinder and adapted to produce an ordered swirl of weak mixture or air around the engine cylinder, valve controlled passages for a rich mixture and for exhaust gases opening into the part of the combustion chamber to one side of the engine cylinder, the roof of which part extends away from the cylinder axis at an angle to a plane at right angles to said axes, the shape of which part of the combustion chamber and of the rich mixture passage are adapted to produce an ordered swirl of rich mixture in that part of the combustion chamber and a sparking plug socket in that part.

2. A spark fired internal combustion engine comprising a cylinder, a piston in the cylinder, a combustion chamber extending over and beyond one side of the engine cylinder, a valve controlled passage for weak mixture or air terminating in a port located in that part of the combustion chamber over the cylinder and adapted to produce an ordered swirl of weak mixture or air around the engine cylinder, valve controlled passages for a rich mixture and for exhaust gases terminating in ports both located in that part of the combustion chamber which is disposed beyond one side of the engine cylinder, which rich mixture passages and the shape of the latter part of the combustion chamber are adapted to produce an ordered swirl of rich mixture in that part of the combustion chamber, and a spark plug socket in that part.

3. A spark fired internal combustion engine comprising a cylinder, a piston in the cylinder, a combustion chamber extending over and to one side of the engine cylinder, a valve controlled passage for weak mixture or air terminating in a port located in that part of the combustion chamber over the cylinder and adapted to produce an ordered swirl of weak mixture or air around the engine cylinder valve, controlled passages for a rich mixture and for exhaust gases terminating in ports both located in that part of the combustion chamber beyond one side of the engine cylinder with a rich mixture port in the roof of the combustion chamber and the exhaust port in the floor of the combustion chamber, which rich mixture passage and the shape of that part of the combustion chamber to one side of the cylinder are adapted to produce an ordered swirl of rich mixture in that part of the combustion chamber and a spark plug socket in that part.

4. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases, terminating in a rich mixture port and an exhaust port both arranged in the roof of the combustion chamber, which rich mixture passage and shape of that part of the combustion chamber to one side of the cylinder are adapted to produce an ordered swirl of rich mixture in that part of the combustion chamber and a spark plug socket in that part.

5. A spark fired internal combustion engine comprising a cylinder, a piston in the cylinder, a combustion chamber extending over and beyond one side of the engine cylinder, a valve controlled passage for weak mixture or air terminating in a port located in that part of the combustion chamber over the cylinder and adapted to produce an ordered swirl of weak mixture or air around the engine cylinder, valve controlled passages for a rich mixture and for exhaust gases, terminating in ports located in that part of the combustion chamber disposed beyond one side of the cylinder and both arranged in the roof of the combustion chamber, which rich mixture passage and the shape of that part of the combustion chamber to one side of the cylinder are adapted to produce an ordered swirl of rich mixture in that part of the combustion chamber, and a spark plug socket in that part.

6. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder, a poppet valve controlling that port and arranged with its axis inclined to the axis of the cylinder in a plane disposed to one side of the cylinder axis so as to produce an ordered swirl of weak mixture or air around the engine cylinder, valve controlled passages for the rich mixture and for the exhaust gases terminating in ports disposed in the part of the combustion chamber beyond one side of the engine cylinder, which rich mixture passage and the shape of the latter part of the combustion chamber are adapted to produce an ordered swirl of rich mixture in that part of the combustion chamber, and a spark plug socket in that part.

7. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder, a poppet valve controlling that port and arranged with its axis inclined to the axis of the cylinder in a plane disposed to one side of the cylinder axis and with its port located immediately adjacent to the cylinder wall so as to produce an ordered swirl of weak mixture or air around the engine cylinder, valve controlled passages for the rich mixture and for the exhaust gases terminating in ports disposed in the part of the combustion chamber beyond one side of the engine cylinder, which rich mixture passage and the shape of the latter part of the combustion chamber are adapted to produce an ordered swirl of rich mixture in that part of the combustion chamber, and a spark plug socket in that part.

8. A spark fired internal combustion engine comprising a cylinder, a piston in the cylinder, a combustion chamber extending over and beyond one side of the engine cylinder, a passage for weak mixture or air terminating in a port in that part of the combustion chamber over the cylinder, a poppet valve controlling that port and having its stem inclined to the axis of that part of the passage adjacent to the port so that the flow of air strikes the inner side of the head of the valve at an angle and is deflected around the cylinder wall so as to produce an ordered swirl of weak mixture or air around the end of the cylinder, valve controlled passages for a rich mixture and for exhaust gases terminating in ports disposed in that part of the combustion chamber beyond one side of the engine cylinder, which rich mixture passage and the shape of the latter part of the combustion chamber are adapted to produce an ordered swirl of rich mixture in that part of the combustion chamber, and a spark plug socket in that part.

9. A spark fired internal combustion engine comprising a cylinder, a piston in the cylinder, a combustion chamber extending over and beyond one side of the engine cylinder, a passage for a weak mixture or air terminating in a port in that part of the combustion chamber over the cylinder, a poppet valve controlling that port and having its stem inclined to the axis of that part of the passage adjacent to the port, a valve seat around the port, the plane of which seat is inclined to a plane at right angles to the axis of the cylinder so that the flow of air strikes the inner side of the head of the valve at an angle and is deflected around the cylinder wall so as to produce an ordered swirl of weak mixture or air around the end of the cylinder, valve controlled passages for a rich mixture and for exhaust gases terminating in ports disposed in that part of the combustion chamber beyond one side of the engine cylinder which rich mixture passage and the shape of the latter part of the combustion chamber are adapted to produce an ordered swirl of rich mixture in that part of the combustion chamber, and a spark plug socket in that part.

10. A spark fired internal combustion engine comprising a cylinder, a piston in the cylinder, a combustion chamber extending over and beyond one side of the end of the cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases terminating in valve seats disposed in the roof of that part of the combustion chamber beyond one side of the engine cylinder, the planes of which valve seats are at right angles to the cylinder axis, and the shape of which part of the combustion chamber and of the rich mixture passages are adapted to produce an ordered swirl of rich mixture in that part of the combustion chamber, and a spark plug socket in that part.

11. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases terminating in ports disposed in that part of the combustion chamber beyond one side of the engine cylinder, which rich mixture passage and the shape of the latter part of the combustion chamber are adapted to produce an ordered swirl of rich mixture in that part of the combustion chamber, and a spark plug socket in that part of the combustion chamber most remote from the engine cylinder axis.

12. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases terminating in ports disposed in that part of the combustion chamber beyond one side of the engine cylinder, that part of the combustion chamber to one side of the cylinder being provided with side walls parallel or nearly parallel to one another and being so shaped and the rich mixture passages being so disposed as to produce an ordered swirl of rich mixture in that part of the combustion chamber to one side of the cylinder, and a spark plug socket in that part.

13. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases terminating in ports disposed in that part of the combustion chamber beyond one side of the engine cylinder with the rich mixture port in the roof of the combustion chamber and the exhaust port in the floor of the combustion chamber, which rich mixture passage and the shape of that part of the combustion chamber to one side of the cylinder are adapted to produce an ordered swirl of rich mixture in that part of the combustion chamber to one side of the cylinder, and a spark plug socket in that part, the stem of the rich mixture valve being inclined to the axis of the cylinder and to the air inlet valve so that their outer ends are close to one another.

14. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases terminating in ports disposed in that part of the combustion chamber beyond one side of the engine cylinder with the rich mixture port in the roof of the combustion chamber, and the exhaust port in the floor of the combustion chamber, which rich mixture passage and the shape of that part of the combustion chamber to one side of the cylinder are adapted to produce an ordered swirl of rich mixture in that part of the combustion chamber to one side of the cylinder, and a spark plug socket in that part, the exhaust valve stem being inclined slightly to the axis of the cylinder so that the edge of the valve seat nearest the cylinder is countersunk in the floor of the combustion chamber.

15. A spark fired internal combustion engine comprising a cylinder, a piston in the cylinder, a combustion chamber extending over and beyond one side of the engine cylinder, a valve controlled passage for weak mixture or air terminating in a port disposed in that part of the combustion chamber over the cylinder and adapted to produce an ordered swirl of weak mixture or air around the engine cylinder, valve controlled passages for a rich mixture and for exhaust gases terminating in ports disposed in that part of the combustion chamber beyond one side of the engine cylinder, which rich mixture passage and the shape of the latter part of the combustion chamber are adapted to produce an ordered swirl of rich mixture in that part of the combustion chamber, and a spark plug socket in that part, and valve gear arranged to open the exhaust valve and to open the air or weak mixture valve at the conventional time and to open the rich mixture valve after the closing of the exhaust valve and to close it before or at the same time as the air valve.

HENRY WESLAKE.

References Cited in the file of this patent
UNITED STATES PATENTS

| Number | Name | Date |
|---|---|---|
| 1,054,080 | Bachmann | Feb. 25, 1913 |
| 1,374,158 | Inshaw | Apr. 5, 1921 |
| 1,722,404 | Whatmough et al. | July 30, 1929 |
| 1,722,799 | Jones | July 30, 1929 |
| 1,733,696 | Ricardo | Oct. 29, 1929 |
| 1,750,063 | Sorg | Mar. 11, 1930 |
| 1,998,708 | Campbell | Apr. 23, 1935 |
| 2,011,992 | Aseltine | Aug. 20, 1935 |
| 2,086,427 | Mock | July 6, 1937 |
| 2,098,875 | Mallory | Nov. 9, 1937 |
| 2,133,592 | Taub | Oct. 18, 1938 |
| 2,179,143 | Brown | Nov. 7, 1939 |
| 2,242,990 | Brown | May 20, 1941 |